CIRCUIT FOR SYNCHRONIZING A LINE-FREQUENCY SWITCH IN A P.A.L. COLOR TELEVISION RECEIVER

Filed Oct. 24, 1967

Inventor:
Werner Henze
BY Spencer & Kaye
Attorneys

Inventor:
Werner Henze
BY Spencer & Kaye
Attorneys

Inventor:
Werner Henze
BY Spencer & Kaye
Attorneys

Oct. 13, 1970 W. HENZE 3,534,156

CIRCUIT FOR SYNCHRONIZING A LINE-FREQUENCY SWITCH IN A P.A.L. COLOR TELEVISION RECEIVER

Filed Oct. 24, 1967 4 Sheets-Sheet 4

Inventor:
Werner Henze

BY Spencer & Kaye
Attorneys

United States Patent Office 3,534,156

Patented Oct. 13, 1970

3,534,156

CIRCUIT FOR SYNCHRONIZING A LINE-FREQUENCY SWITCH IN A P.A.L. COLOR TELEVISION RECEIVER

Werner Henze, Hannover, Germany, assignor to Telefunken Patentverwertungsgesellschaft m.b.H., Ulm (Danube), Germany Filed Oct. 24, 1967, Ser. No. 677,612
Claims priority, application Germany, Nov. 2, 1966, T 32,431; May 22, 1967, T 33,907
Int. Cl. H04n *9/46*
U.S. Cl. 178—5.4 7 Claims

ABSTRACT OF THE DISCLOSURE

The present invention relates to a color television receiver and to a circuit for synchronizing a line-frequency switch in such a receiver by means of a received color burst the phase or frequency of which is reversed from line to line (alternating burst). The line frequency switch is controlled by an oscillator being synchronized or triggered by line frequency pulses, preferably line flyback pulses, and generating a switching voltage of half the line frequency. The alternating color burst is fed to a narrow pass band filter, e.g. a quartz filter, via a second switch connecting the burst to the filter line by line directly or via a 90° phase shifter. From the output voltage of the filter there is derived by means of a rectifier a direct voltage which is used for changing phase or frequency of the oscillator in the event of incorrect phase of the switching voltage.

The invention relates to a color television receiver adapted to receive a color television signal including a color synchronizing signal, the so-called color burst having its phase or frequency changed from line to line (alternating color burst).

In color television receivers of the prior art the color burst has been used for achieving a reference carrier of color carrier frequency and constant phase, which is required for demodulation. In P.A.L. type color television receivers the alternating color burst has been used, too, for ensuring the correct switching phase of a half line frequency change over switch switching line by line the phase of the color carrier or the phase of the reference carrier by ±90 degrees. With one known receiver, the color burst is fed to a discriminator delivering as well a direct control voltage for a reference carrier generator as an alternating voltage for ensuring the correct switching phase. In such a circuit there is required a so-called active reference carrier generator. It is often desired, however, to utilize a so-called passive reference carrier generator consisting of a narrow band pass filter, e.g. a quartz, mechanical, or ceramic filter, which filters the carrier from the spectrum of the received color burst. The above mentioned discriminator then can be omitted. With such receivers however the simple method of ensuring the correct switching phase cannot be used.

SUMMARY OF THE INVENTION

It is an object of the invention to provide a color television receiver having a passive reference carrier generator as well as a circuit for ensuring the correct switching phase.

In the case of a very narrow-band filter (for instance a quartz filter) which is controlled with a color synchronizing signal in opposite phase from line to line, the output voltage becomes approximately zero, while in the case of color synchronizing signals that are in equal phase from line to line it assumes an optimum value. By keeping the changeover switch in the wrong position of phase of the color synchronizing signals, the result can be obtained that the changeover switch is adjusted in each case to the position whereas regards the filter the two components of the color synchronizing signal are in phase equality from line to line.

It is a still further object of the invention to provide a color television receiver.

Briefly stated, and in accordance with certain aspects of this invention there is provided in a color television receiver adapted to receive a color television signal including a color burst having its phase or frequency changed from line to line, a narrow band filter fed with the color burst and delivering a continuous reference carrier, a rectifier being fed with said continuous reference carrier and delivering a direct control voltage dependent on the amplitude of said continuous reference carrier, an oscillator being synchronized or triggered by line frequency pulses and oscillating at half the line frequency, first and second switches operated by the output voltage (switching voltage) of the oscillator which second switch is serving for switching the phase of the received color burst through 90 degrees before it is passed to the narrow pass band filter, and means for interrupting said oscillator by said direct control voltage in the event of incorrect phase of the output voltage (switching voltage) of the oscillator.

BRIEF DESCRIPTION OF THE DRAWINGS

The specification concludes with claims particularly pointing out and distinctly claiming the subject matter which is regarded as the invention. The invention may also be understood from the following description taken in connection with the accompanying drawings in which:

DESCRIPTION OF THE PREFERRED EMBODIMENTS

Figure 1:
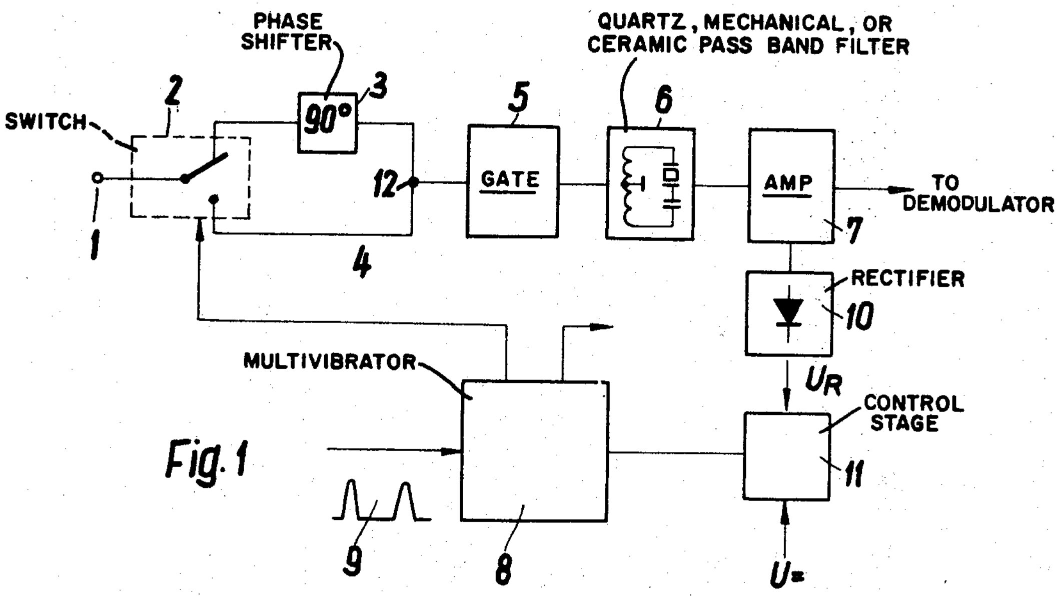
FIG. 1 is a block schematic of the invention.

In FIG. 1 the color television signal chroma passes across the input terminal 1 to a switch 2, which in every second line in time switches on a 90° phase shifter device 3. The color television signal which is passed in one line across the phase shifter 3 and in the next line across the path 4 reaches a gate 5, passing the color synchronizing signal (color burst) only transmitted at the beginning of every line. The color synchronizing signal passes to a narrow-band filter 6, which filters out the carrier from the spectrum of the color synchronizing signal. The output voltage of the filter 6, i.e. the reference carrier, passes directly or via an amplifier 7 to the demodulator, which is not shown here. The switch 2 is controlled by a multivibrator 8, which is controlled by line pulses 9, e.g. flyback pulses of the line scanning transformer. This multivibrator 8 serves for producing a switching meander for the half-line frequency switch. To synchronize the switching phase of the multivibrator 8 there is connected to the amplifier 7 a rectifier 10, which derives from the color-carrier frequency output voltage of the quartz filter 6 a control direct voltage. This is compared in a control stage 11 with a fixed direct voltage. The fixed direct voltage can either be a fixed voltage of the mains part, or it can be obtained by rectification of the line flyback pulses. The output voltage of the control stage 11 is connected to the multivibrator 8 in such a way that the multivibrator is blocked when the control direct voltage $U_R$ has a minimum value as a result of the absence of an output voltage of the filter 6. When the output voltage of the filter 6 is provided again, the blocking of the multivibrator 8 ceases, and this furnishes both to the halfline frequency switch and to the switch 2 a continuous switching meander.

Figure 2:
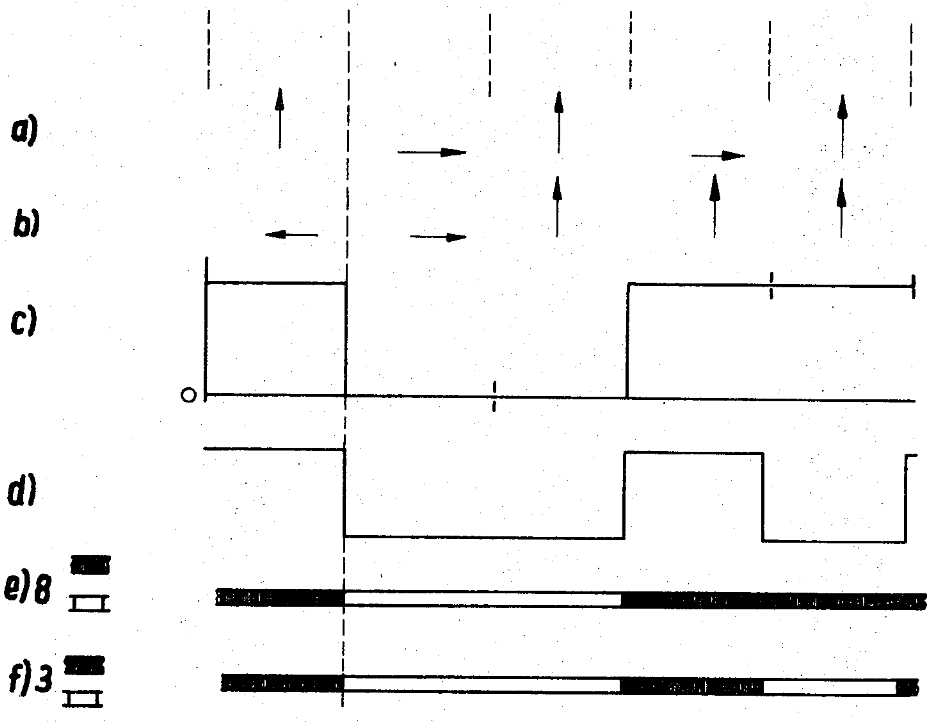
FIG. 2 shows vectors and waveforms for illustrating the operation of the invention.
Figure 4:
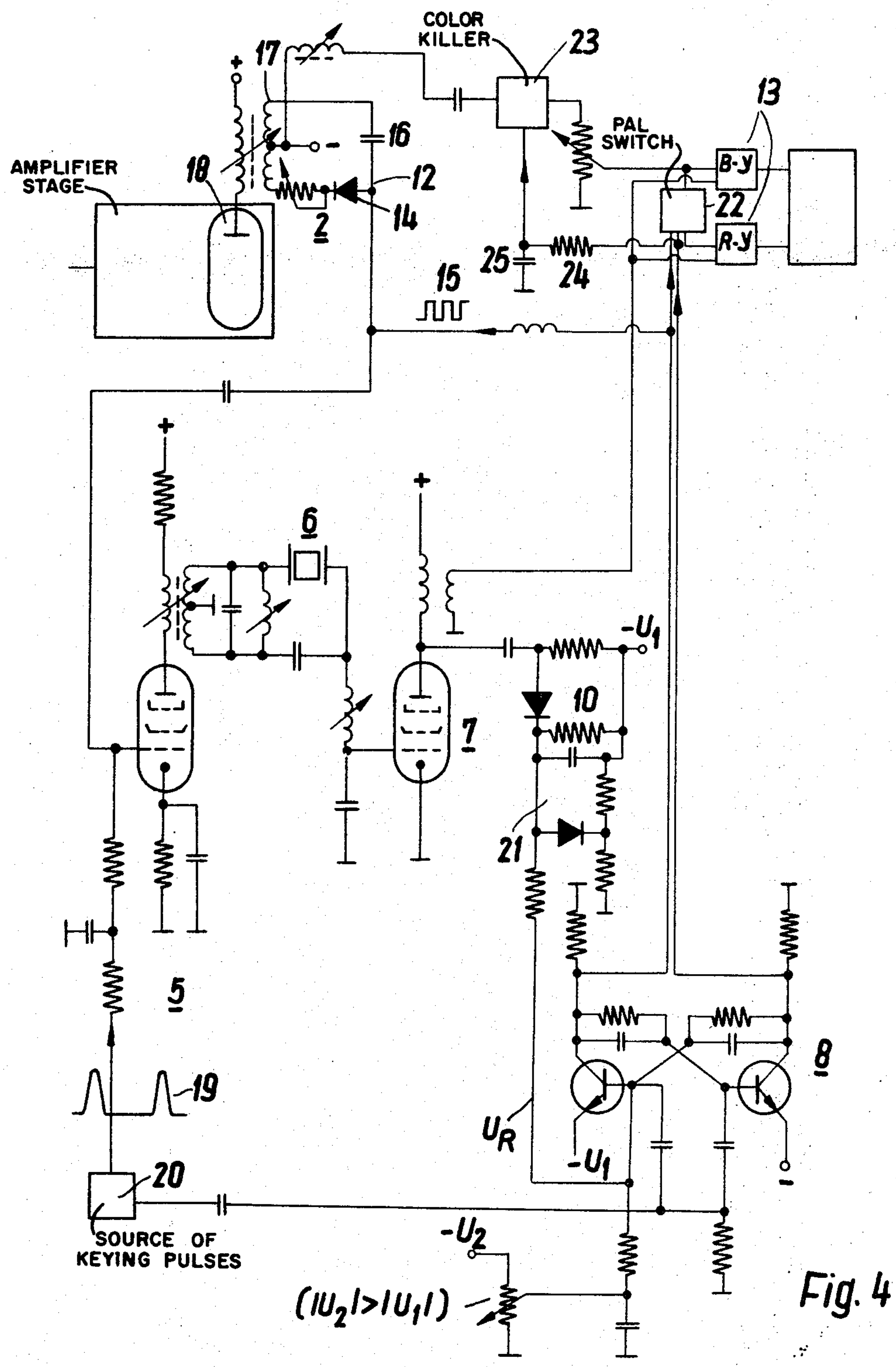
FIG. 4 is a practical form of one embodiment of the invention.

The method of operation of the circuit according to FIG. 1 is explained below by means of FIG. 2. The phase position of the color synchronizing signal at the input terminal 1 is shown in the topmost column for five consecutive lines as a vector diagram. The vector points upwards in line 1, in line 2 to the right, in line 3 upwards, in line 4 to the right and in line 5 upwards again. Through the action of the switch 2, the phase shifter 3 is switched on and off from line to line. In this way there is produced the vector sequence produced in the second column, referred to the circuit point 12 of FIG. 1. In line 1 the vector is shifted 90° i.e. it now points to the left. In line 2 the vector remains unchanged, i.e. it points to the right. In such a vector sequence according to lines 1 and 2, where the two consecutive vectors in time are directed opposited to one another, the filter 6 does not furnish any output voltage. Thus the control voltage $U_R$ vanishes and the multivibrator 8 is thus stopped. The behaviour of the output voltage of the filter 6 is represented in FIG. 2*c*, where it is always the figures given from one line to the next that are of interest, for it is only at these points that the multivibrator is caused to tip through line pulses. FIG. 2*e* shows that at the moment when the output voltage of the filter 6 becomes zero, the multivibrator 8 is blocked. The switching meander represented in FIG. 2*d* shows at this point a longer interval which, as may be seen from FIG. 2*f*, makes the switch 2 ineffectual for the period of this pause. This again means that in line 3 of FIG. 2*b* the vector is not rotated 90° as really provided for, but retains its original phase position. This means that at the end of line 3 the output voltage of the filter 6 again assumes a finite value and now makes the multivibrator 8 ineffectual across the rectifier 10 and the control stage 11. In line 4 therefore as shown in FIG. 2*b*, the vector is again rotated 90°, the switch 2 being actuated. In line 5 the switch 2 is again changed over, so that here, too, the vector remains uninfluenced. Unless interference occurs, this process takes place in the same way. In the above specification it has been assumed for reasons of clarity that the blocking of the multivibrator takes place after even one line with wrong phase position. In practice it has been found that the drop in the control voltage $U_R$ suffices to block the multivibrator only after a few lines of wrong phase position.

The circuit arrangement can be varied in such way that the control stage is replaced by a blocking stage, to which there are passed on the one hand the control direct voltage $U_R$ and on the other the line flyback pulses, and their output voltage controls the multivibrator directly.

Figure 3A:
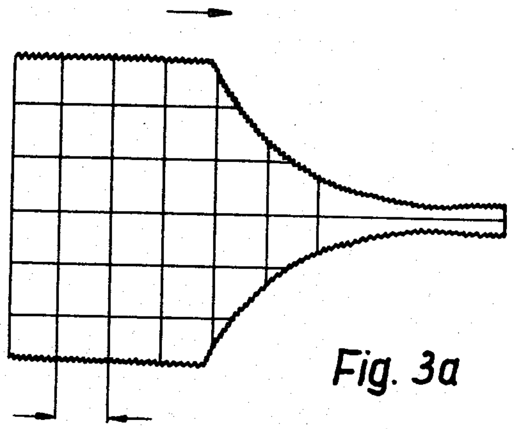
FIGS. 3*a* and 3*b* show oscillograms.
Figure 3B:
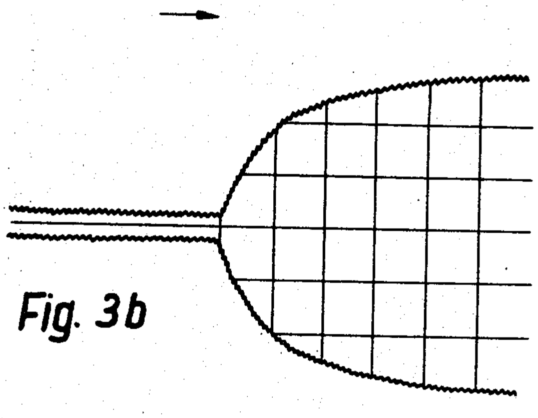

FIG. 3 shows two oscillograms of the output voltage of the filter 6 or the amplifier 7. In the oscillogram of FIG. 3*a* the passage from the correct phase position of the switch 2 to the wrong phase position is represented, and in the oscillogram of FIG. 3*b* the construction of the output voltage of the filter 6 after an interval of wrong phase position of the switch 2.

FIG. 3 shows a detailed circuit according to the block circuit diagram represented in FIG. 1, that has been tested in practice. The same components are provided in the figures with the same references. The switch 2 which is formed by a diode 14 is controlled by a half-line frequency switching meander 15. The diode 14 and a condenser 16 forming the phase shifter 3 are connected in the output of a secondary circuit 17 with centre point tapping. From the centre point tapping the color signals find their way to the demodulator 13 which may take the form of a transit time demodulator and also of a simple demodulator. The secondary circuit 17 is the output circuit of a chroma amplifier stage 18, in particular the last one. The connecting point 12 is connected to the usual blanking out stage 5, to which are passed at the control grid keying pulses 19 from a source of keying pulses 20, e.g. the scanning transformer. The filter 6 arranged at the output of the keying stage 5, here a quartz filter of a maximum 200 cycles band width, is connected with an amplifier 7. The output signals of the amplifier 7 pass on the one hand to the demodulator 13, and on the other to the rectifier 10 which furnishes the control voltage $U_R$ for the multivibrator 8 here across a limiter 21. The two switching meanders of the multivibrator 8 pass to the P.A.L. switch 22, which perodically changes over the phase position of the $R-Y$ signal. If the color synchronizing signals fail, the multivibrator indeed receives the line frequency voltage 19, but no further working voltage from the rectifier 10. Thus the meander oscillations cease. In this way, both the P.A.L. switch 22 and the switch 2 are stopped. This is furthermore used for a color killer 23, this receiving a voltage from an RC network 24, 25 connected to the multivibrator 8. At the condenser 25 there is adjusted in operation a direct voltage which corresponds to the alternating current axis of the switching meander, but in the absence of the meander rises or drops to a fixed value.

Figure 5:
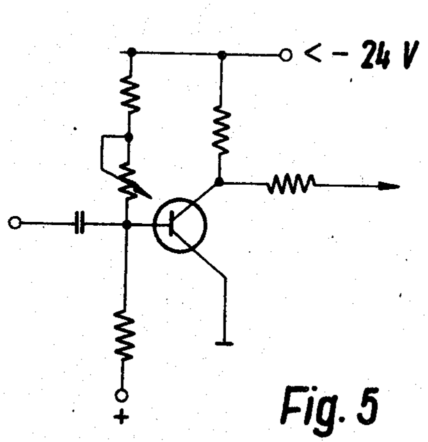
FIG. 5 is a practical form of the rectifier for rectifying the continuous reference carrier.

FIG. 5 shows a modification of the rectifier 10, which here takes the form of a transistor circuit.

In the circuit arrangement described above, the narrow band filter under certain circumstances can even then furnish an output voltage, when the gated color synchronizing signal is in phase opposition to the color cynchronizing signal which is gated in the previous line. This voltage comes about through the side lines of the color synchronizing signal which are at line frequency distance on both sides of the fundamental wave of the color carrier oscillation. In the case of a large amplitude of the color synchronizing signal it is then possible that the output voltage of the narrow band filter furnishes, on the rectification of the carrier oscillation, so high a direct voltage, that with opposite-phase color synchronizing signal, the switch or its control generator can no longer be stopped reliably. This is due to the fact that with an oppositely phased color synchronizing signal the fundamental wave indeed becomes zero, but the side lines of the color synchronizing signal after Fourier do not become zero and pass to the rectifier with excessive amplitudes. The greater the band width of the filter, the greater the amplitude of the direct voltage then becomes. According to a further embodiment of the invention the circuit is also safeguarded against the effect of such large amplitudes, since by amplitude rectification of the color synchronizing signal a further direct voltage is obtained, and the difference between the two direct voltages acts as control voltage for the changeover switch or its control generator. In the case of opposite-phase color synchronizing signals from line to line, the further direct voltage U2 is greater than the direct voltage U1. Therefore, the voltage difference stops the switch or its control generator. With equal phase color synchronizing signals, the first direct voltage is greater and brings about the "further running" of the switch or its control generator.

Figure 6:
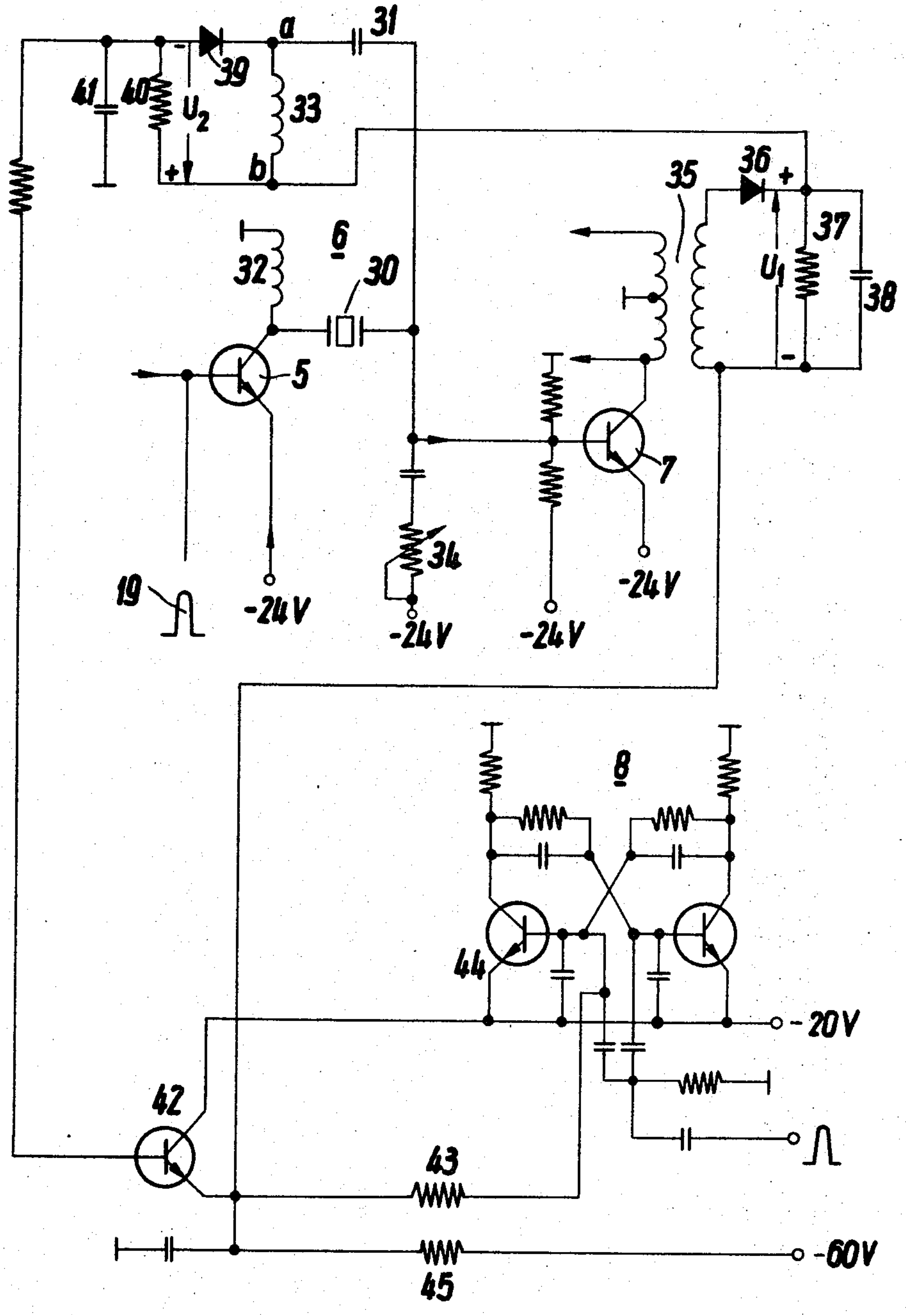
FIG. 6 shows a circuit diagram ensuring correct interruption of the oscillator.

A corresponding practical example is represented in FIG. 6. This the chroma signal or the FBAS signal is passed to the base of the gate 5, to which gating pulses 19 are passed at the same time. At the output of the gate there is arranged a quartz filter with a quartz 30, a condenser 31 and two bifilar wound coils 32 and 33. The quartz filter 6 is dimensioned in such a way that at the connecting point of the quartz 30 and the condenser 31 there is produced a continuous reference carrier which is passed to the input electrode of an amplifier 7 for the reference carrier. An adjustable resistance 34 serves to vary the phase position of the continuous carrier. In the output circuit of the amplifier 7 there is arranged a transformer 35 from which are derived on the one hand the signals for the demodulator (not shown) and which on the other hand contains a rectifier circuit with a rectifier 36 and a load circuit consisting of a resistance 37 and a condenser 38. The bifilar wound coils 32 and 33 are dimensional in such a way that opposite-phase color synchronizing signals are at their extremities. At the upper end *a* of the coil 33 there is available a color synchronizing signal (color burst) which is fed to a rectifier 39 with a load circuit having a resistance 40 and a condenser 41. The lower end *b* of the coil 33 is connected with the upper end of the load circuit 37, 38 so that the direct voltages U1, U2 generated in the load circuits 37, 38 and 40, 41 are connected in series. Both direct voltages U1 and U2 are, however, directed oppositely to one another so that at the series circuit of the two load circuits there is produced the difference between the direct voltages U1 and U2. The series circuit of the two load circuits 37, 38 and 40, 41 is connected to the base-emitter path of a transistor 42, which is operated in the conducting state when the phase position of the received color synchronizing signals is correct. The emitter-collector path of the transistor 42 is connected in series with a resistance 43 in parallel with the emitter-base path of a transistor 44 in the multivibrator 8. If in the case of the reception of oppositely phased color synchronizing signals the voltage U2 becomes greater than the voltage U1, the negative voltage preponderates compared with the emitter at the base of the transistor 42 and thus blocks the emitter-collector path of this transistor. In this case the effect of the voltage divider 43, 45 makes itself noticeable and interrupts the oscillations of the multivibrator 8.

In its method of operation, the circuit is practically independent of mains voltage fluctuations and variations of amplitude. From the circuit for rectifying the continuous reference carrier or the color synchronizing signal it is also possible to derive a control voltage for the amplifier of the chroma signal, whereby the cost of the receiver circuit is reduced.

It will be understood that the above description of the present invention is susceptible to various modifications, changes and adaptations and the same are intended to be comprehended within the meaning and range of equivalents of the appended claims.

What is claimed is:

1. In a color television receiver adapted to receive a color television signal including a color burst having its phase or frequency changed from line to line, a narrow pass band filter fed with the color burst and delivering a continuous reference carrier, a rectifier being fed with said continuous reference carrier and delivering a direct control voltage dependent on the amplitude of said continuous reference carrier, an oscillator being synchronized or triggered by line frequency pulses and oscillating at half the line frequency, first and second switches operated by the output voltage (switching voltage) of the oscillator which second switch is serving for switching the phase of the received color burst through 90 degrees before it is passed to the narrow pass band filter, and means for interrupting said oscillator by said direct control voltage in the event of incorrect phase of the output voltage (switching voltage) of the oscillator.

2. Circuit according to claim 1, whereby the filter (6) is a quartz filter.

3. Circuit according to claim 1, whereby the filter (6) is a ceramic filter.

4. Circuit arrangement according to claim 1, whereby the filter (6) is a mechanical filter.

5. Circuit according to claim 1, further comprising an integrating circuit for achieving from the output voltage of the oscillator a direct voltage serving as color killer for the chroma channel of the receiver.

6. Circuit according to claim 1, further comprising a circuit for rectifying the color burst which circuit is connected in series to the rectifier for rectifying the continuous reference carrier, whereby the difference of the achieved direct voltages is utilized as a control voltage for said oscillator.

7. In a color television receiver according to claim 6 a quartz filter having the series connection of a quartz and a condenser connected in parallel to two bifilar wound inductances the outer terminal of one inductance being connected to the circuit for rectifying the color burst, whereas the other terminal of said one inductance is connected to the load circuit of the rectifier being fed with the continuous reference carrier.

References Cited

FOREIGN PATENTS 1,175,731 4/1963 Germany.

RICHARD MURRAY, Primary Examiner

J. C. MARTIN, Assistant Examiner